United States Patent
Starik et al.

[11] Patent Number: 6,007,131
[45] Date of Patent: Dec. 28, 1999

[54] WRITING INSTRUMENT HOLDER

[75] Inventors: Yuri A. Starik; Cliff A. Rubenstein, both of Marysville, Ohio

[73] Assignee: Honda Giken Kogyo Kabushiki Kaisha, Tokyo, Japan

[21] Appl. No.: 08/976,632

[22] Filed: Nov. 24, 1997

[51] Int. Cl.$^6$ ................................................ B60N 3/12
[52] U.S. Cl. ........................ 296/37.8; 211/69.1; 224/571; 248/309.1
[58] Field of Search ................................. 296/37.1, 37.8, 296/37.14; 248/316.2, 313, 311.2, 316.7, 74.2, 309.1; 211/69.5, 69.1, 89.01, 69.8; 224/567, 571; D19/77, 81–85; 281/30; 206/306, 371; 15/435; 24/545, 563; D08/71, 396, 394; 312/902

[56]                References Cited

U.S. PATENT DOCUMENTS

| | | | |
|---|---|---|---|
| 3,275,274 | 9/1966 | Hutcheon | 248/301.1 |
| 3,827,152 | 8/1974 | Dailey | 248/316.7 X |
| 4,867,498 | 9/1989 | Delphia et al. | 296/37.8 X |
| 4,962,874 | 10/1990 | Hagglund . | |
| 5,180,089 | 1/1993 | Suman . | |
| 5,192,042 | 3/1993 | Wotring et al. | 248/176.1 |
| 5,301,856 | 4/1994 | Newsome . | |
| 5,379,929 | 1/1995 | Eskandry . | |
| 5,480,037 | 1/1996 | Pope | 206/371 X |
| 5,588,542 | 12/1996 | Winkler, Jr. et al. | 211/89.01 X |
| 5,743,414 | 4/1998 | Baudino | 248/316.7 X |
| 5,794,905 | 8/1998 | Richter | 248/316.4 |
| 5,823,494 | 10/1998 | Jones et al. | 248/309.1 |
| 5,839,712 | 11/1998 | Wang | 248/316.2 |
| 5,863,089 | 1/1999 | Ignarra et al. | 296/37.8 |

*Primary Examiner*—D. Glenn Dayoan
*Assistant Examiner*—Jason Morrow
*Attorney, Agent, or Firm*—Carrier, Blackman & Associates, P.C.; Joseph P. Carrier; William D. Blackman

[57]                ABSTRACT

In combination a holder for an object and a console for a vehicle comprises a first groove formed on a planar surface of the console for receiving an object such as a writing instrument therein, a second groove formed in the console adjacent to the first groove, and a clip removably secured in the second groove and extending over the first groove for retaining the object in the first groove. The clip is preferably composed of a flexible, resilient material such as rubber, the second groove is elongate, and the clip is slidable along the second groove. Further, the second groove is preferably defined in the console at an incline relative to a surface of the console such that the upper portion of the clip projects a varying amount above the console as the clip is slid along the second groove such that different sized objects may be held thereby. Still further, the console preferably includes a projecting sidewall adjacent the second groove, and the projecting sidewall engages a face of the clip for stabilizing the clip.

20 Claims, 2 Drawing Sheets

WRITING INSTRUMENT HOLDER

BACKGROUND OF THE INVENTION

1. Field of the Invention

The present invention pertains to a writing instrument holder for a vehicle or the like, and particularly to a writing instrument holder which can securely and reliably retain substantially any size writing instrument in a vibration-preventing manner, and such that the writing instrument is conveniently accessible to vehicle occupants.

2. Description of the Relevant Art

There are many known writing instrument holders which may be used or are designed for use in vehicles. For example, U.S. Pat. Nos. 4,962,874, 5,180,089, 5,301,856, 5,379,929, and 5,484,066 each disclose a holder device which may be used to hold a writing instrument or the like in a vehicle. The holder in U.S. Pat. No. 4,962,874 is an elongate bracket or recess defined in a back surface of a rigid plate or board and sized to receive a writing instrument therein. The holder device of U.S. Pat. No. 5,180,089 (shown in FIG. 7 thereof) is simply a horizontal groove defined in an upper surface of a flat plate and shaped to support a writing instrument therein, as well as a central, enlarged opening defined completely through the flat plate at the center of the groove and through which a finger or the like may be inserted for pushing the writing instrument upwardly out of the groove. The holder disclosed in U.S. Pat. No. 5,301,856 is simply a plurality of sleeves secured to one face of a sun visor or the like, each of the sleeves being adapted to receive a writing instrument therein. The holder disclosed in U.S. Pat. No. 5,379,929 is a loop of rigid material extending from one face of a sun visor or the like, and which is adapted to engage an intermediate portion of the writing instrument inserted therethrough. The holder disclosed in U.S. Pat. No. 5,484,066 is a unitary, plastic molded member including a flat backing plate having adhesive provided on a back surface thereof for being adhesively bonded to a vehicle dashboard or the like, and a plurality of flexible clip structures extending perpendicularly away from the backing plate, each of which is adapted to support a writing instrument. The clip structures each include a pair of substantially semispherical arms which may be flexed away from each other for applying a gripping force to a writing instrument inserted therein, and the clip structures are provided in two different sizes for accommodating the different-sized instruments.

Although each of the known writing instrument holders may be effectively used for its intended purpose, there are limitations and disadvantages associated therewith. For example, none of the known holders may be effectively used to hold many different size writing instruments. Rather, each of the holders disclosed in U.S. Pat. Nos., 4,962,874, 5,180, 089, 5,301,856 and 5,379,929 is fairly limited to stably supporting a single, given sized writing instrument, while the holder of U.S. Pat. No. 5,484,066 simply includes two different sized clip structures for supporting two different sized writing instruments.

Relatedly, if the known holders in the discussed patents were used, or attempted to be used, in relation to different sized writing instruments the holder would be damaged or permanently distorted from its optimum configuration and/ or at least one of the writing instruments would not be securely retained by the holder, causing annoying vibrations and/or disengagement of the writing instruments relative to the holders during vehicle travel.

Further, several of the known holders project within the passenger compartments of the vehicles, which is undesirable because the holders take up valuable space and may obstruct the view of or come in contact with vehicle occupants. Relatedly, the holders tend to detract from the appearance of the vehicle's interior.

On the other hand, some of the known holders are not conveniently accessible because vehicle occupants are required to manipulate portions of the holder structures, such as by opening up a sun visor, to expose the writing instrument, and because the known holders generally require the holder structure to be gripped with one hand while the writing instrument is removed with the other.

The present invention has been developed to overcome the disadvantages and limitations of known writing instrument holders, including those discussed above, and to generally fulfill the need in the art for a writing instrument holder which is relatively simple in structure, readily adaptable/adjustable for use with substantially any size writing instrument, has a favorable, inconspicuous appearance, and is convenient to use when disposed within a vehicle.

SUMMARY OF THE INVENTION

According to the invention, there is provided in combination a holder for an object and a console for a vehicle, comprising:

a first groove formed in the console for receiving the object;

a second groove formed in the console adjacent to the first groove; and a clip removably secured in the second groove and extending over the first groove for retaining the object in the first groove.

With such combination according to the invention, a writing instrument or other object is supported directly on the vehicle console for convenient access by vehicle occupants, and is otherwise stably held against movement while the vehicle is traveling by the cooperation between the first groove and the clip which extends over the first groove.

Preferably, the clip is composed of a flexible, resilient material such as rubber so that it can engage the object with a modest force to maintain the object stably in place without vibrations while the vehicle is traveling, and without the provision of a spring or other separate biasing means. Also, by forming the clip of a flexible, resilient material, it can be used to selectively hold different objects with different sized diameters, while still returning to its original shape once the object is removed.

Further, the second groove will preferably be elongate and the clip will be slidable along the second groove relative to the first groove for facilitating insertion and removal of the object relative to the first groove. Most preferably, the second groove will extend at an angle within the console and the first groove will extend substantially parallel to the surface of a console such that an object-engaging portion of the clip will project a varying amount above the console surface for thereby adjusting the size of a gap between the clip and the first groove, such that different sized objects may be securely retained by simply sliding the clip member along the second groove to an appropriate location. Still further, the clip may preferably be selectively removable from the second groove for, again, facilitating insertion and removal of an object relative to the first groove.

It is also preferable that the second groove will include a lateral channel and the clip will include a laterally extending leg engaging the second groove such that the side movement of the clip is minimized. Similarly, it is preferred that the console will include a side wall projecting above the console surface at one side thereof, the second groove will be disposed adjacent to the side wall, and the clip will abut against the side wall for stabilizing the clip as it is slid along the second groove or maintained in a position of the second groove and, again, for limiting side movement of the clip.

It is an object of the invention to provide a writing instrument or other object holder for a vehicle having a simple, economic construction, and which can securely hold different sized writing instrument(s) in a vibration free manner.

It is another object of the invention to provide such a writing instrument holder which is compact in size, unobtrusive, and has a favorable appearance.

It is a further object of the invention to provide such a writing instrument holder which is readily adjustable and/or readily removable for accommodating different sized writing instruments or other objects.

It is yet another object of the invention to provide such a writing instrument holder which holds a writing instrument in a manner such that the instrument is conveniently accessible to occupants of the vehicle.

Other objects, advantages and salient features of the invention will be apparent from the following detailed description, which, when taken in conjunction with the annexed drawings, discloses the presently preferred embodiments of the invention.

DETAILED DESCRIPTION OF THE PREFERRED EMBODIMENTS

Figure 1:
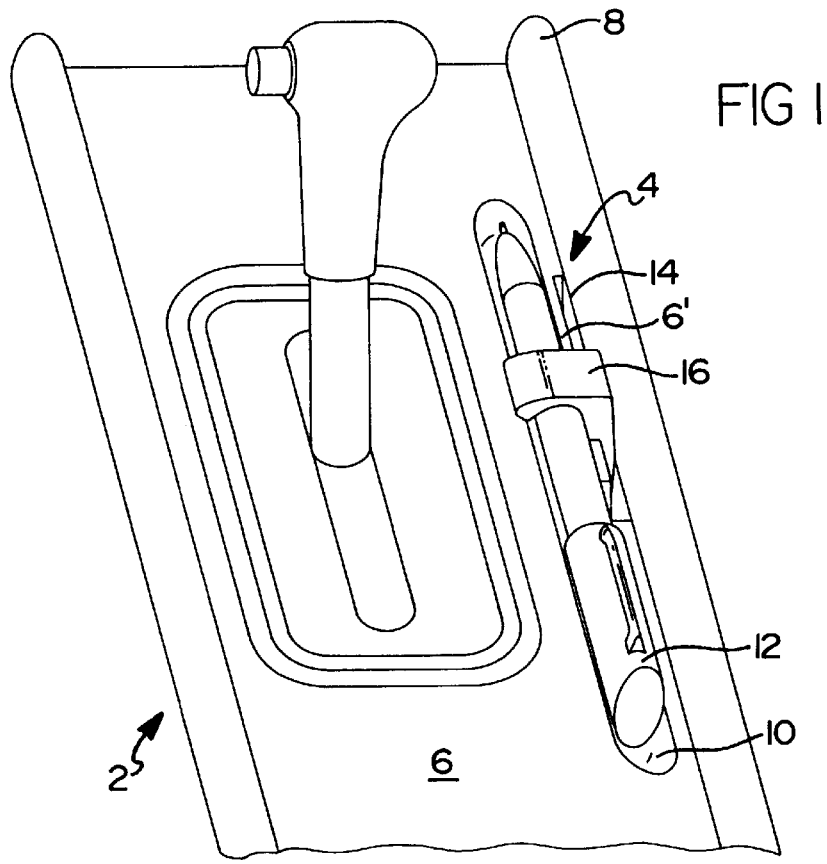
FIG. 1 is a perspective view of a first presently preferred embodiment of the invention in which a writing instrument holder is provided in combination with the shifter console of a vehicle.

Referring to FIGS. 1, 2, 5 and 6 there is shown a first presently preferred embodiment of a holder structure according to the invention. The holder structure includes a console 2 and a holder means 4 in operative cooperation. The console 2 may, for example, be a shifter console for a vehicle as depicted, including a planar upper surface 6 and a pair of side walls 8 which project above the planar surface 6 at opposite sides thereof.

The holder means 4 comprises a first groove 10 defined in the planar surface 6 of the console and which is shaped such that a writing instrument 12 or other object may rest or be supported therein; a second groove 14 disposed adjacent to a first groove 10 and extending downwardly into the console 2 further than the first groove 10; and a clip 16 having a lower portion 18 thereof secured within the second groove 14 and an upper portion 20 thereof which projects above the first groove 10 such that the writing instrument 12 may be stably supported between the first groove and the upper projecting portion of the clip.

The first groove 10 is preferably only a shallow groove defined in the console surface 6 such that a writing instrument 12 loosely engages a surface of the groove 10, but is not securely engaged thereby, such as would be the case if a first groove 10 were formed more deeply into the surface 6 and a writing instrument 12 were snap-fitted thereto. The first groove 10 is an elongate, narrow groove corresponding to a shape of most writing instruments, and will preferably have tapered ends for facilitating removal of the writing instrument 12 therefrom, e.g. the instrument may be removed by simply sliding the instrument along the first groove until it extends beyond one end thereof.

The second groove 14 is preferably also an elongate groove, although not as long as the first groove 10, and will preferably be substantially L-shaped in cross section with a wider, lateral channel 14' at a lower end thereof for receiving a correspondingly shaped lower portion or leg 18 of the clip 16 therein. Such shape of the second groove 14 and the lower portion 18 of the clip permits the clip to be stably slid along the second groove 14 while limiting sideways movement of the clip in a direction perpendicular to the second groove 14. Sliding movement of the clip is very desirable for facilitating insertion and removal of the writing instrument 12 into the first groove 10 because the clip can be slid toward one end of the first groove when the writing instrument is to be inserted or removed, and the clip can be slid toward the center of the first groove for securing the writing instrument in place between the clip and the first groove.

Figure 2:
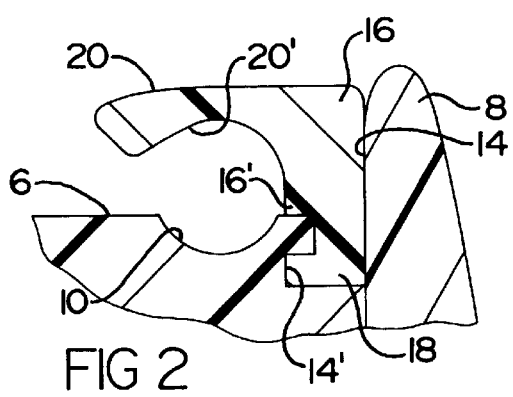
FIG. 2 is a cross-sectional view taken along line 2—2 in FIG. 1.

Additionally, the second groove will also preferably be disposed directly adjacent to one of the projecting side walls 8 of the console 2 as shown in FIGS. 1 and 2 such that the clip 16 abuts against an inner face of the side wall when the clip is inserted in the second groove 14, for again stabilizing the clip 16 in a stationary position thereof and as it is slid along the second groove, while minimizing sideways movement of the clip.

Figure 6:
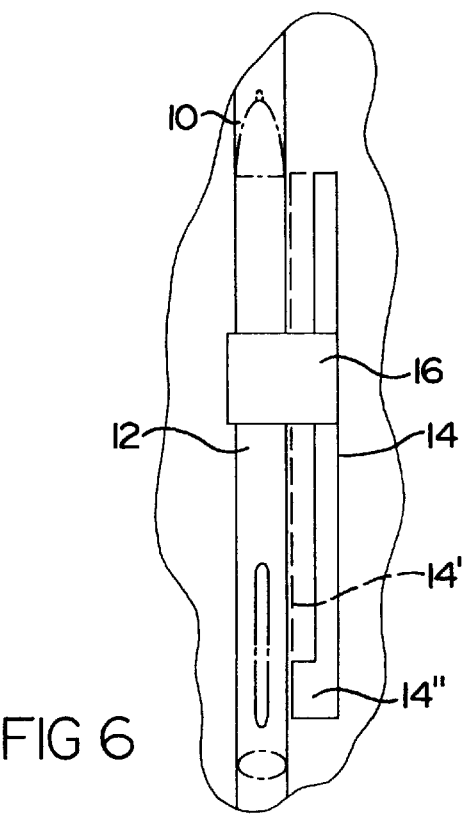
FIG. 6 is a top plan view showing the clip member engaged within the second groove according to either of the first and second embodiments of the invention.

Still further, and as best shown in FIG. 6, the second groove 14 will preferably be enlarged at one end 14" thereof such that the lower portion 18 of the clip 16 can be readily and easily inserted into or removed from the second groove 14 by hand, without any special tool, by simply inserting the lower portion of the clip into the second groove 14 through the enlarged end portion 14" thereof.

Figure 5:
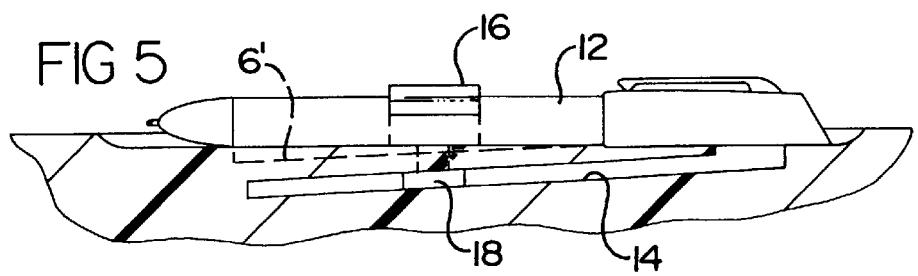
FIG. 5 is a side view, partly in section, showing the manner in which the second groove is angled downwardly within the console according to either of the first and second embodiments of the invention.

With reference to FIG. 5, the second groove 14 preferably extends into the console at a downwardly inclined slope from one end to the other thereof, whereas the first groove 10 extends parallel to the planar surface 6 of the console; and correspondingly a narrow band 6' of the surface 6 of the console between the first and second grooves 10, 14 also extends downwardly at an incline from one end thereof toward the other as shown in FIGS. 1 and 5. Due to such arrangement, the upper portion 20 of the clip 16 projects to a varying extent above the planar surface 6 as the clip is slid along the second groove 14. This is very desirable because it permits the holding means 4 to readily and easily accommodate different sized writing instruments having different diameters by simply sliding the clip to a position where the writing instrument is securely engaged between the clip and the first groove 10.

As best shown in FIGS. 1 and 2, and as briefly described above, the clip 16 preferably has the substantially L-shaped lower portion 18 which fits into the second groove 14 for being slid therealong and an upper portion 20 extending upwardly from the lower portion and projecting horizontally over the first groove 10 such that the writing instrument 12 may be securely engaged between the upper portion 20 and the surface 6 of the console defining the first groove. More particularly, and with reference to FIG. 2, the lower surface 20' of the projecting arm of the upper portion of the clip 16 is preferably concave in shape such that a substantially circular opening is defined between the first groove and the clip, corresponding to the circular cross-sectional shape of most writing instruments.

Also, it is preferable according to the invention that the clip 16 will be constructed of a flexible, resilient material such as rubber. This is desirable because the clip may be flexed to accommodate different sized writing instruments even if it is not slid along the second groove 14, and after a writing instrument is removed the clip will resiliently flex back to its original, optimum shape even after it is used to retain several different sized writing instruments. The resilient, flexible nature of the clip 16 is also desirable because the clip can then be moved to a position where it engages the writing instrument with a small amount of force corresponding to the flexing of the upper portion 20 of the clip, such that the writing instrument cannot vibrate against the surface of the console defining the first groove 10 nor become disengaged therefrom while the vehicle is traveling.

As discussed above, the L-shape of the lower portion of the clip 16 cooperates with the correspondingly shaped second groove to permit sliding movement of the clip, while limiting sideways movement thereof, while relatedly the side wall 8 of the console engages a relatively large side face of the clip for stabilizing the clip and, again, limiting sideways movement thereof. Additionally, the upper portion of the clip will preferably include a shoulder 16' which extends horizontally over the planar surface 6 of the console toward the first groove 10. Such shoulder 16' provides additional stability to the clip when the clip engages a writing instrument 12 or is slid along the second groove 14.

Figure 3:
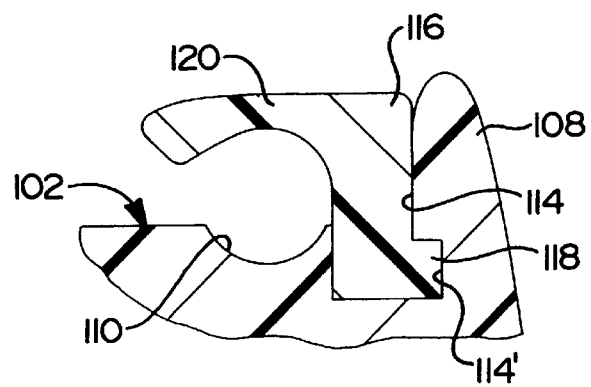
FIG. 3 is a cross-sectional view similar to FIG. 2, but in which the sliding leg portion of a holder clip is modified to extend away from the first groove and into a side wall of the console.

Referring to FIG. 3, there is shown a modification of clip and console according to the first embodiment. In the modification of FIG. 3, the lower portion 118 of the clip 116 and the sidewall 108 of the console are modified such that the lower portion 118 of the clip has the same dimension as the upper portion 120 of the clip from which it extends, and in that a lateral channel 114' of the second groove 114 extends away from the first groove 110 into the sidewall 108, and a lateral extension of the lower clip portion 118 extends into such lateral channel 114'. The clip 116 and console 102 thus modified function equivalently to the embodiment shown in FIGS. 1, 2, 5 and 6 and achieves all of the advantages thereof.

Figure 4:
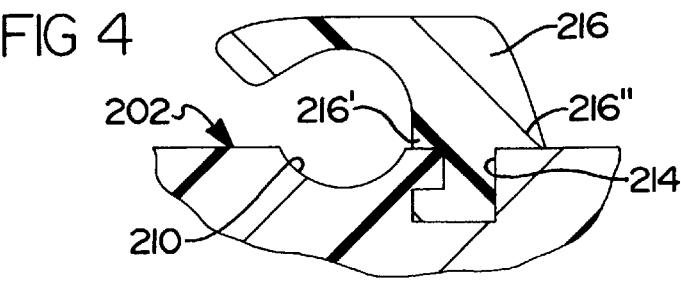
FIG. 4 is a view similar to FIG. 2, but showing a second presently preferred embodiment of the invention in which the console does not include a side wall.

Referring to FIG. 4 there is shown a cross-sectional side view similar to FIG. 2, but showing a second presently preferred embodiment of the invention. The second embodiment is identical to the first embodiment in all aspects except that the second groove 214 is formed in a flat section of the console 202 which is not adjacent to any projecting side wall of the console, and in that the upper portion of the clip 216 is modified to include not only a first shoulder 216' extending toward the first groove 210, but also to include a second shoulder 216" extending away from the first groove 210. The second shoulder 216" of the clip 216 provides additional stability against sideways movement of the clip when it is engaging a writing instrument or as it is slid along the second groove 214 comparable to the stability achieved in the first embodiment by engagement of the side face of the clip 16 with the sidewall 8 of the console. Again, the second embodiment of the invention achieves all of the advantages that are achieved by the first embodiment of the invention as discussed above.

Although there have been described what are present considered to be the preferred embodiments of the invention, it will be understood by persons skilled in the art that various modifications and changes can be made thereto without departing from the gist, spirit, or essence of the invention. For example, although the above embodiments have been discussed in relation to a holder for a writing instrument, it will be understood that the holder device of the invention could be used to hold other objects including other tubular or cylindrical members such as a flashlight, objects such as cellular phones, etc. Also, although the above preferred embodiments have been described in relation to a console having a planar, horizontal surface, the holder device could involve a vertical surface, a slanted surface, etc.

The scope of the invention is, therefore, indicated by the appended claims, rather than by the foregoing description of the presently preferred embodiments.

I claim:

1. A combination of a holder for an object and a console for a vehicle comprising:

a first groove formed in said console for receiving said object;

a second groove formed in said console adjacent to said first groove; and a clip removably secured in said second groove and extending over said first groove for retaining said object in said first groove;

said clip being slidable along said second groove parallel to said first groove.

2. The combination according to claim 1, wherein said elongate second groove extends into said console in an inclined manner such that a projecting portion of said clip projects a varying amount relative to a surface of the console as the clip is slid along said second groove.

3. The combination according to claim 2, wherein said second groove is inclined from one end thereof toward the other end thereof.

4. The combination according to claim 1, wherein said elongate second groove includes an enlarged section, and said clip is selectively insertable into and removable from said second groove at said enlarged section.

5. The combination according to claim 1, wherein said clip is composed of a flexible, resilient material.

6. The combination according to claim 5, wherein said clip is composed of rubber.

7. The combination according to claim 1, wherein said second groove includes a lateral channel, said clip includes a leg, and said leg engages said lateral channel of said second groove such that sideways movement of the clip is minimized.

8. The combination according to claim 1, wherein said second groove is substantially L-shaped in cross section, and a lower portion of said clip secured in said second groove is correspondingly L-shaped in cross-section.

9. The combination according to claim 1, wherein said clip includes at least one shoulder engaging said console adjacent to said second groove for stability.

10. The combination according to claim 1, wherein said console includes a sidewall projecting beyond a surface of said console in which said first groove is defined, said second groove is located adjacent to said sidewall, and said sidewall engages a face of said clip.

11. An object holding device comprising:
a first groove defined in a support surface for receiving an object therein;
holder means disposed adjacent to the first groove for engaging the object received in the first groove to stably maintain the object between the first groove and the holder means; and
means for receiving said holder means such that said holder means is slidably adjustable along the length of said first groove.

12. A holder device according to claim 11, wherein said receiving means includes a second groove defined in the support surface adjacent to said first groove and said holder means includes a clip having a first portion secured in said second groove for sliding movement therealong and a second portion extending over said first groove for engagement with the object.

13. A holder device according to claim 12, wherein said clip is composed of a flexible, resilient material such that said second portion thereof may be resiliently flexed toward and away from said first groove.

14. A holder device according to claim 13, wherein said clip is composed of rubber.

15. A holder device according to claim 11, wherein said holder means is adjustable such that said holder means can engage different sized objects as said holder means is slid relative to said first groove.

16. A holder device according to claim 12, wherein said receiving means further includes means for stabilizing the clip against movement in a direction other than a direction in which the clip is slid.

17. A holder device according to claim 12, wherein said second groove includes an enlarged section, and said clip is selectively insertable into and removable from said second groove at said enlarged section.

18. A holder device according to claim 12, wherein the upper portion of said clip includes a concave surface disposed opposite to said first groove for defining a substantially circular opening therebetween.

19. A holder device according to claim 11, wherein said holder means moves in a direction parallel to said first groove as the holder means is slid along said first groove between different operative positions of the holder means.

20. The combination according to claim 9, wherein said clip includes a leg received in said second groove and said shoulder is disposed outside of said second groove.

* * * * *